United States Patent
Hammond et al.

(10) Patent No.: US 9,927,040 B2
(45) Date of Patent: Mar. 27, 2018

(54) ROTARY VALVE

(71) Applicant: Rota Val Ltd, Chippenham (GB)

(72) Inventors: David Hammond, Trowbridge (GB); Derek Smith, Trowbridge (GB)

(73) Assignee: Rota Val Ltd, Chippenham (GB)

( * ) Notice: Subject to any disclaimer, the term of this patent is extended or adjusted under 35 U.S.C. 154(b) by 128 days.

(21) Appl. No.: 14/864,744

(22) Filed: Sep. 24, 2015

(65) Prior Publication Data

US 2016/0091105 A1 Mar. 31, 2016

(30) Foreign Application Priority Data

Sep. 26, 2014 (GB) .................................. 1417044.3

(51) Int. Cl.
| | |
|---|---|
| *B65G 53/46* | (2006.01) |
| *F16K 27/02* | (2006.01) |
| *F16K 1/34* | (2006.01) |
| *F16K 31/44* | (2006.01) |

(52) U.S. Cl.
CPC .......... *F16K 27/02* (2013.01); *B65G 53/4633* (2013.01); *F16K 1/34* (2013.01); *F16K 31/44* (2013.01)

(58) Field of Classification Search
CPC . F16K 27/02; F16K 31/44; F16K 1/34; B65G 53/4633
USPC ......... 251/307; 137/315.17, 315.25; 222/368
See application file for complete search history.

(56) References Cited

U.S. PATENT DOCUMENTS

| | | | | |
|---|---|---|---|---|
| 4,906,144 A | * | 3/1990 | Matsueda | B65G 53/4633 222/368 |
| 5,002,084 A | * | 3/1991 | Wilson | B65G 53/4633 137/15.24 |
| 6,186,164 B1 | | 2/2001 | Pfeifer et al. | |

FOREIGN PATENT DOCUMENTS

| | | | | |
|---|---|---|---|---|
| CN | 202321531 | | 7/2012 | |
| DE | 4135594 A1 | * | 5/1993 | ......... B65G 53/4633 |
| DE | 4301774 A1 | * | 7/1994 | ......... B65G 53/4633 |

OTHER PUBLICATIONS 8 pages from http://rotaval.co.uk, Dec. 12, 2014.
Rota Val Ltd, 'Fast-Clean' Rotary Valves, Feb. 2001, pp. 1-4, http://wvvw.rotaval.co.uk/uploads/Brochures/FCT_RVB62_Issue_2.pdf (retrieved Feb. 22, 2016), England.

* cited by examiner

*Primary Examiner* — Marina Tietjen
(74) *Attorney, Agent, or Firm* — Lightbulb IP, LLC

(57) ABSTRACT

A rotary valve comprising a rotor shaft support assembly for maintaining a rotor shaft 5 in a level orientation when the rotor shaft is supported at a single end only. The rotor shaft support assembly (101) comprises a removable casing end plate (102) and a bearing assembly (106) for supporting an end portion of the rotor shaft (104) inserted into the rotor shaft support assembly (101) and through a rotor shaft aperture (105) of the removable casing end plate (102), and is adjustable to correct any deviation of 10 the pitch of the rotor shaft (104) from a level orientation relative to the removable casing end plate (102) when the rotor shaft (104) is supported at a single end only by the rotor shaft support assembly (101) with the inserted end portion of the rotor shaft (104) supported within the removable casing end plate (102) and the bearing assembly (106).

14 Claims, 2 Drawing Sheets

ROTARY VALVE
>
> ## CROSS-REFERENCE TO RELATED APPLICATION
>
> This application claims priority to GB 1417044.3, filed Sep. 26, 2014.
>
> ## FIELD OF THE INVENTION
>
> The present invention relates to a rotary valve for conveying fluids, powders or granular substances.
>
> ## BACKGROUND OF THE INVENTION
>
> Rotary valves are used in a variety of different industries, including the pharmaceutical, chemical and food industries. A rotary valve is usable to transfer fluids, powders or granular substances from one stage of a processing line to another.
>
> A typical rotary valve comprises a casing, which has an upper inlet and a lower outlet, in which a rotor comprising a rotor shaft and vanes is housed. Solid bulk product may be conveyed through the rotary valve with the assistance of a gas (typically air) pressure differential.
>
> A rotary valve may be used to control the rate of flow of a product, and may have an explosion/flame-containment design. To achieve high sealing and feeding efficiency, the clearance between the rotor vanes and the casing must be maintained within a narrow tolerance range. However it is usual for the rotor to be removed regularly from the casing, to allow cleaning. A problem exists with maintaining proper alignment of the rotor when the rotor has been removed from, and is to be subsequently replaced in, the casing.
>
> A type of rotary valve is known in which an end portion of the rotor shaft is supported within a bearing assembly of a removable end plate of the casing, the removable end plate being coupled with a pair of guide rails that are slidably coupled to the main body of the casing. This arrangement allows the rotor to be conveniently withdrawn from, and inserted into, the interior of the casing, by slidably moving the removable end plate of the casing away from, and towards, the interior of the casing, respectively. The guide rails serve to facilitate movement of the rotor and to maintain the rotor in an aligned position relative to the interior of the casing. However, a problem exists with 'drop' or 'downward pitch' of the rotor shaft from the ideal level orientation, which is experienced when the rotor shaft is supported at a single end only within the removable end plate of the casing.
>
> It is an object of the present invention to provide a rotary valve with improved rotor alignment features.
>
> ## SUMMARY OF THE INVENTION
>
> The invention provides a rotary valve for conveying fluids, powders or granular substances, said rotary valve comprising: a rotor having a rotor shaft and vanes, and a casing for housing the rotor within the interior of the casing, said casing comprising a removable casing end plate defining a rotor shaft aperture into which an end portion of the rotor shaft is insertable; wherein said rotary valve comprises a rotor shaft support assembly, said rotor shaft support assembly comprises said removable casing end plate and a bearing assembly for supporting an end portion of the rotor shaft inserted from the inner side of the removable casing end plate into the rotor shaft support assembly and through said rotor shaft aperture of the removable casing end plate, and said rotor shaft support assembly is adjustable to correct any deviation of the pitch of the rotor shaft from a level orientation relative to said removable casing end plate when the rotor shaft is supported at a single end only by the rotor shaft support assembly with the inserted end portion of the rotor shaft supported within the removable casing end plate and the bearing assembly.
>
> The rotary shaft support assembly advantageously serves to maintain the rotor shaft in a level orientation when the rotor shaft is supported at a single end only by the rotor shaft support assembly with the inserted end portion of the rotor shaft supported within the removable casing end plate and the bearing assembly, which is beneficial when the rotor is being withdrawn from or inserted the casing of the rotary valve.
>
> The bearing assembly may comprise a bearing housing and inner and outer bearing adjustment rings each in threaded engagement with, and rotatable within, the bearing housing. The bearing assembly may comprise a first, inner rolling bearing, a second, outer rolling bearing and a spacing ring disposed therebetween, all located between the inner and outer bearing adjustment rings.
>
> The rotor shaft support assembly may comprise a tail piece. The tail piece may comprise a substantially tubular body having inner and outer ends and a flange extending radially outwardly of the outer surface of the substantially tubular body. The bearing assembly may be disposed radially around the outer surface of the tail piece. The end portion of the rotor shaft may be removably locatable within the tail piece to be supported within the removable casing end plate and the bearing assembly.
>
> The flange may be positioned axially between said inner and outer ends of said tail piece. The flange of said tail piece may be axially located between the inner and outer bearing adjustment rings. The flange of the tail piece may be axially located between the inner bearing adjustment ring and the first, inner rolling bearing.
>
> The inner bearing adjustment ring may comprises an annular abutment shoulder that extends outwardly and axially over the flange of the tail piece and abuts the first, inner rolling bearing. The outer bearing adjustment ring may abut the second, outer rolling bearing.
>
> The bearing housing may define a threaded aperture within which a fine adjustment screw is received, the fine adjustment screw in contact with and rotatable against the removable casing end plate.
>
> The removable casing end plate may define a threaded aperture within which a screw is received, the screw in contact with and rotatable against an outer surface of the inner bearing adjustment ring.
>
> A threaded aperture may be defined in the end of the end portion of the rotor shaft, a threaded aperture may be defined in the end of the outer end of the substantially tubular body of the tail piece, and the rotor shaft support assembly may further comprise: a rotor shaft securing screw, a tail piece securing screw, and a retaining washer defining apertures corresponding to said threaded apertures of the rotor shaft and the tail piece; the rotor shaft and the tail piece being fixed to rotate together when the rotor shaft and tail piece securing screws extend through the retaining washer and are in threaded engagement with the rotor shaft and the tail piece respectively.
>
> The flange of the tail piece may be held against the first, inner rolling bearing when the rotor shaft and the tail piece are fixed to rotate together. A face may be formed along the rotor shaft at a point of increased diameter of the rotor shaft, and the face may be held against the inner end of the tail piece when the rotor shaft and said tail piece are fixed to rotate together.

The removable casing end plate may be coupled with a pair of rails that are slidably coupled to the main body of the casing.

BRIEF DESCRIPTION OF THE DRAWINGS

The present invention will now be more particularly described, with reference to the accompanying drawings, in which.

DESCRIPTION

Example embodiments are described below in sufficient detail to enable those of ordinary skill in the art to embody and implement the systems and processes herein described.

The present invention relates to the alignment of a vaned rotor of a rotary valve, and provides a rotary valve comprising a rotor shaft support assembly.

Figure 1A:
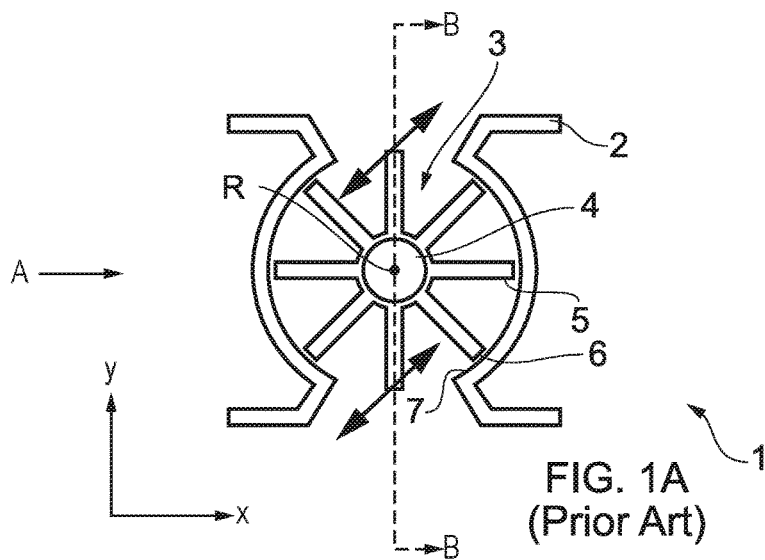
FIGS. 1A-1C illustrate features of alignment of a vaned rotor within a casing of a prior art rotary valve.
Figure 1B:
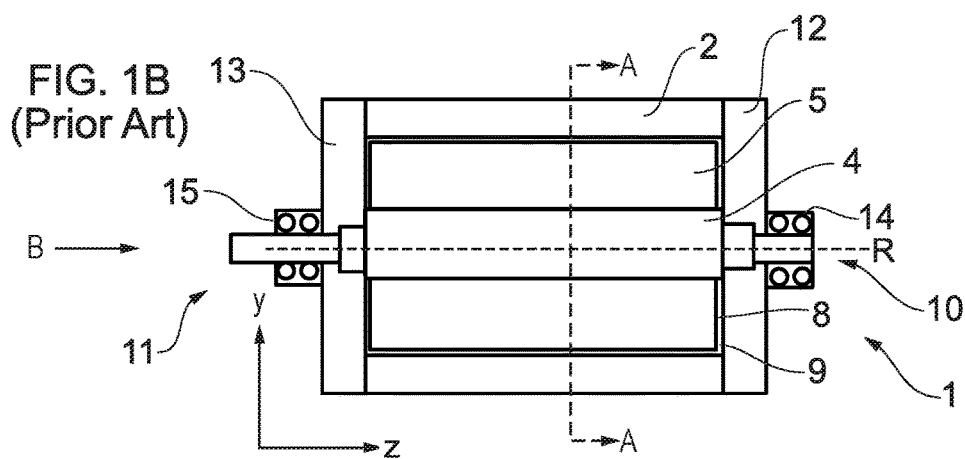
Figure 1C:
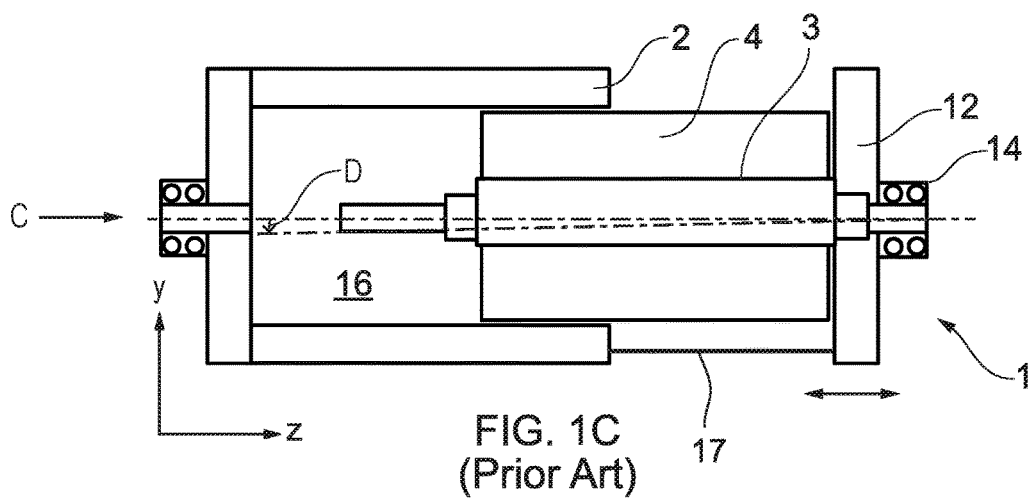

FIGS. 1A-1C respectively show schematics A, B and C of a prior art rotary valve I comprising a casing 2 for housing a rotor 3, the rotor 3 comprising a rotor shaft 4 with vanes 5. The vanes 5 are equidistantly spaced around the rotor shaft 4 of the rotor 3.

In schematics A and B the rotor 3 is shown fully housed within the casing 2 of the rotary valve 1, and in schematic C the rotor 3 is shown only partially located within the casing 2 of the rotary valve 1. Schematic A illustrates an end cross-sectional view along line A-A of schematic B. Schematics B and C illustrate a side cross-sectional view along line B-B of schematic A, but with the rotor 3 in different positions relative to the casing 2 of the rotary valve 1.

Referring to schematics A and B, the rotor shaft 4 is aligned within the interior of the main body of the casing 2 in the X-axis and Y-axis directions, which extend in the width direction and the height direction of the interior of the main body of the casing 2 respectively. Axis Z extends in the length direction of the interior of the main body of the casing 2. The axis of rotation R of the rotor shaft 4 of rotor 3 is also indicated.

Alignment of the rotor shaft 4 within the interior of the main body of the casing 2 ensures that the vanes 5 are free to rotate without the end edges 6 of the vanes 5 fouling the internal wall surfaces 7 of the casing 2 and without the side edges 8 of the vanes 4 fouling the internal end wall surfaces 9 of the casing 2.

As can be seen most clearly from schematic A, centralised alignment of the end portions of the rotor shaft 4 in the X-axis and Y-axis directions of the cross-sectional area of the interior of the casing 2, in the X-axis and Y-axis plane perpendicular to the Z-axis direction, ensures that there is an equal clearance between the end edges 6 of the vanes 5 and the internal curved wall surfaces 7 of the casing 2, for balanced rotation.

As can be seen most clearly from schematic B, centralised alignment of the end portions of the rotor shaft 4 in the Y-axis and Z-axis directions of the cross-sectional area of the interior of the casing 2, in the in the Y-axis and Z-axis plane perpendicular to the X-axis direction, ensures that there is an equal clearance between the side edges 8 of the vanes 4 and the internal end wall surfaces 9 of the casing 2.

Referring again to schematic B, the rotor 3 is shown aligned within the casing 2 such that the rotor shaft 4 extends in an ideal level orientation through the casing 2. When the rotor 3 is fully located within the casing 2, both end portions 10, 11 of the rotor shaft 4 are supported by casing end plates 12, 13, each of which defines a rotor shaft aperture into which an end portion of the rotor shaft 4 is insertable and each of which is provided with a respective bearing assembly 14, 15. The end portions of the rotor shaft 4 are supported in alignment in the Y-axis direction, such that that the axis of rotation R of the rotor shaft 4 extends in the ideal level orientation through the casing 2.

As illustrated in schematic C, the casing end plate 12, with bearing assembly 14, is removable and movable in a direction along the Z-axis, which allows the rotor 3 to be withdrawn from, and inserted into, the interior 16 of the main body of the casing 2. The casing end plate 12 may be coupled with a pair of guide rails 17 that are slidably coupled to the main body of the casing 2. The guide rails 17 serve to maintain the alignment of the casing end plate 12, and in turn the supported end of the rotor shaft 4, in the X-axis and Y-axis directions, in the X-axis and Y-axis plane perpendicular to the Z-axis direction, relative to the interior 16 of the main body of the casing 2. This feature of alignment functions to facilitate the withdrawal of the rotor 3 from, and insertion of the rotor 3 within, the main body of the casing 2 without the rotor vanes 4 contacting the internal curved wall surfaces 7 of the casing 2.

However, a problem exists with 'drop' or 'downward pitch' of the rotor shaft 4 of the rotor 3 from the ideal level orientation, as indicated by arrow D, which is experienced when the rotor shaft 4 is supported at a single end only. As indicated in schematic C, when the rotor shaft 4 is supported at a single end only within the casing end plate 12, the unsupported end can 'drop' below the supported end, causing the rotor shaft 4 to slope downwardly from the supported end to the unsupported end, in the Z-axis direction. Such a 'downward pitch' of the rotor shaft 4 is undesirable, as the rotor shaft 4 must be brought back towards a level orientation to avoid impact between the rotor 3 and the casing 2 during withdrawal of the rotor 3 from, and insertion of the rotor 3 into, the casing 2 of the rotary valve 1.

The present invention seeks to address the problem of misalignment between the rotor 3 and the main body of the casing 2 caused when the rotor shaft 4 is supported at a single end only and the unsupported end of the rotor shaft 4 is lower than the supported end of the rotor shaft 4.

The present invention provides a rotary valve comprising a rotor shaft support assembly, the rotor shaft support assembly for maintaining a rotor shaft in a level orientation when the rotor shaft is supported at a single end only and so adjustable as to correct any deviation of the pitch of the rotor shaft from a level orientation when the rotor shaft is supported at a single end only.

Figure 2:
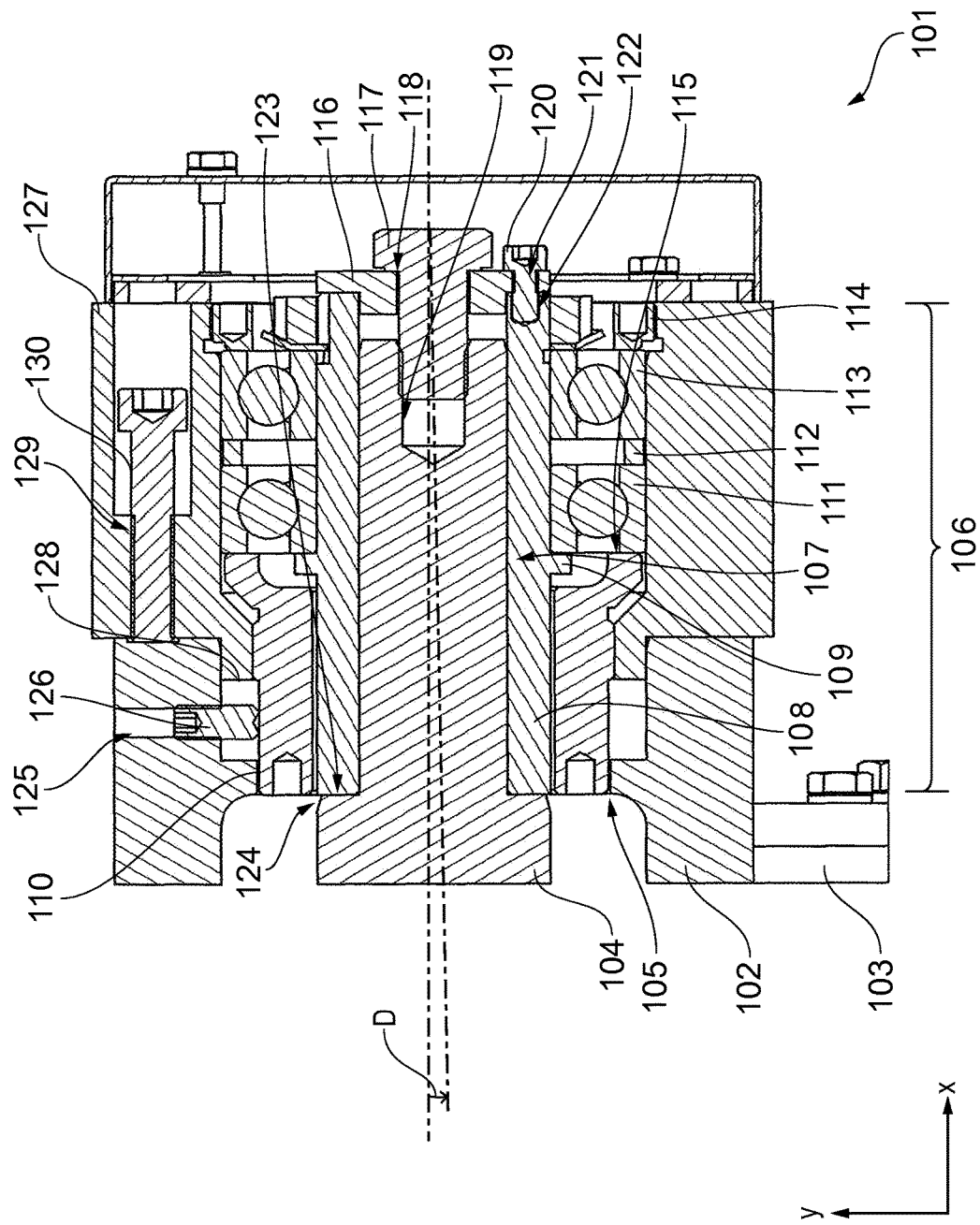
FIG. 2 illustrates features of a rotor shaft support assembly of a rotary valve embodying the present invention.

FIG. 2 illustrates features of a rotor shaft support assembly 101 of a rotary valve according to the present invention. The rotary valve comprises a casing (not fully shown) having an upper feed inlet and a lower discharge outlet, and an interior in which a rotor comprising a rotor shaft and vanes is housed. In use, the rotor rotates to convey a fluid, powder or granular material received through the inlet to the outlet for discharge through the outlet. The casing comprises a main body and two casing end plates, each defining a rotor shaft aperture into which an end portion of the rotor shaft is insertable and between which the rotor shaft extends when the rotor is fully housed in the casing. One end of the rotor shaft is operatively engaged to a drive mechanism (not shown) that controls rotation of the rotor.

The rotor shaft support assembly 101 comprises a removable casing end plate 102 of the casing of the rotary valve. The removable casing end plate 102 may be, and in this described embodiment is, coupled with a pair of guide rails (not shown) that are slidably coupled to the main body of the casing (not shown) of the rotary valve. Fixings 103 are shown for coupling the removable casing end plate 102 to one of the pair of guide rails. The guide rails facilitate the disassembly of the casing end plate 102 from, and the assembly of the casing end plate 102 with, the main body of the casing, which, with an end portion of the rotor shaft 104 supported by the rotor shaft support assembly 101, in turn facilitates the removal of the rotor from, and insertion of the rotor into, the interior of the casing.

In this Figure, the left hand side of the shown rotor shaft support assembly 101 is the 'inner' side and the right hand side of the shown rotor shaft support assembly 101 is the 'outer' side. In addition, the 'axial' and 'radial' directions of the shown rotor shaft support assembly 101 are defined relative to the 'axial' and 'radial' directions of the rotor shaft 104 when supported within the rotor shaft support assembly 101.

The rotor shaft support assembly 101 is serves to maintain the rotor shaft 104 in a level orientation when the rotor shaft 104 is supported at a single end only by the rotor shaft support assembly 101 and is adjustable to correct any deviation of the pitch of the rotor shaft 104 from a level orientation when the rotor shaft 104 is supported at a single end only by the rotor shaft support assembly 101.

The removable casing end plate 102 defines a rotor shaft aperture 105 into which an end portion of the rotor shaft 104 is insertable.

The rotor shaft support assembly 101 further comprises a bearing assembly 106 for supporting an end portion of the rotor shaft 104 inserted from the inner side of the removable casing end plate 102 into the rotor shaft support assembly 101 and through said rotor shaft aperture 105 of the removable casing end plate 102.

The rotor shaft support assembly 101 serves to maintain the rotor shaft 104 in a level orientation when the rotor shaft 104 is supported at a single end only by the rotor shaft support assembly 101 with the inserted end portion of the rotor shaft 104 supported within the removable casing end plate 102 and the bearing assembly 101, and is adjustable to correct any deviation of the pitch of the rotor shaft 104 from a level orientation when the rotor shaft 104 is supported at a single end only by the rotor shaft support assembly 101 with the inserted end portion of the rotor shaft 104 supported within the removable casing end plate 102 and the bearing assembly 101.

The rotor shaft 104 is shown extending through the rotor shaft aperture 105 of the casing end plate 102, with an end portion located within a tail piece 107. The tail piece 107 comprises a substantially tubular body 108 having inner and outer ends and a flange 109 that extends radially outwardly of the outer surface of the substantially tubular body 108. The substantially tubular body 108 of the tail-piece is sleeve-like. The flange 109 is positioned axially between the inner and outer ends of the tail piece 107.

The bearing assembly 106 is disposed radially around the outer surface of the tail piece 107. The end portion of the rotor shaft 104 is removably locatable within the tail piece 107 to be supported within the removable casing end plate 102 and the bearing assembly 106 of the rotor shaft support assembly 101.

The bearing assembly 106 comprises, axially from the inner side to the outer side of the shown rotor shaft support assembly 101, an inner bearing adjustment ring 110, a first rolling bearing 111, a spacer ring 112, a second rolling bearing 113 and an outer bearing adjustment ring 114.

The inner bearing adjustment ring 110 is positioned axially to the inner side of the flange 109 of the tail piece 107. The inner bearing adjustment ring 110 is located in the rotor shaft aperture 105 of the removable casing end plate 102, disposed radially between the tail piece 107 and the removable casing end plate 102.

The first rolling bearing 111, spacer ring 112, second rolling bearing 113 and outer bearing adjustment ring 114 are positioned axially to the outer side of the flange 109 of the tail piece 107. The flange 109 of the tail piece 107 is therefore located between the inner and outer bearing adjustment rings 110, 114.

The inner bearing adjustment ring 110 presents an annular abutment shoulder 115 that extends radially outwardly and axially towards the outer side of the rotor shaft support assembly 101. As shown, the annular abutment shoulder 115 of the inner bearing adjustment ring 110 extends over the flange 109 of the tail piece 107, such that the first rolling bearing 111, spacer ring 112 and second rolling bearing 113 are disposed axially between, on the inner side of the rotor shaft support assembly 101, the flange 109 of the tail piece 107 and the annular abutment shoulder 115 of the inner bearing adjustment ring 110, and on the outer side of the rotor shaft support assembly 101, the outer bearing adjustment ring 114.

The annular abutment shoulder 115 of the inner bearing adjustment ring 110 and the flange 109 of the tail piece 107 are both shown abutting against the first bearing ring 111, and the outer bearing adjustment ring 114 is shown abutting against the second bearing ring 113.

A retaining washer 116 is located axially to the outer side of the tail piece 107. The retaining washer 116 is shown abutting against the outer side end of the tail piece 107. A rotor shaft securing screw 117 is shown extending through a central aperture 118 in the retaining washer 116 and releasably engaging with a threaded aperture 119 in the end of the rotor shaft 104, which extends in the axial direction. A tail piece securing screw 120 is shown extending through an off-centre aperture 121 in the retaining washer 116 and releasably engaging with a threaded aperture 122 in the outer side end of the tail piece 107, which extends in the axial direction. In this way, the tail piece 107 and the rotor shaft 104 are fixed to rotate together. In addition, the flange 109 of the tail piece 107 is held against the first rolling bearing III of the bearing assembly 106. Further, a face 123 of the rotor shaft 104, which is formed by an increase in the diameter of the rotor shaft 104 at point 124, is held against the inner end of the tail piece 107.

The removable casing end plate 102 defines a threaded aperture 125, which extends in the radial direction. A screw 126, which in this illustrated embodiment is a headless screw, is shown received within the threaded aperture 125 of the removable casing end plate 102 and in contact with and rotatable against an outer surface of the inner bearing adjustment ring 110. Turning the screw 126 has the effect of tightening components arranged within the rotor shaft support assembly 101.

The bearing assembly 106 comprises a bearing housing 127 that is disposed radially of the inner bearing adjustment ring 110, first rolling bearing 111, spacer ring 112, second rolling bearing 113 and the outer bearing adjustment ring 114. The bearing housing 127 extends axially fully partially over the inner bearing adjustment ring 110 and fully over the first rolling bearing 111, spacer ring 112, second rolling bearing 113 and the outer bearing adjustment ring 114.

The inner bearing adjustment ring 110 and the outer bearing adjustment ring 114 are each in threaded engagement with the bearing housing 127. Rotation of the inner and outer bearing adjustment rings 110, 114 causes the rotated bearing adjustment ring 110 or 114 to travel in an axial direction along the Z axis. The inner and outer bearing adjustment rings 110, 114 are in this way adjustable to hold the first rolling bearing 111, spacer ring 112 and second rolling bearing 113 therebetween within the rotor shaft support assembly 101.

The bearing housing 127 comprises an annular flange 128 that extends axially towards the inner side of the rotor shaft support assembly 101 and which is disposed radially between the inner bearing adjustment ring 110 and the casing end plate 102.

The bearing housing 127 defines a threaded aperture 129, extending in the axial direction. A fine adjustment screw 130 is shown received within the threaded aperture 129 of the bearing housing 127 and in contact with and rotatable against the removable casing end plate 102. Turning the fine adjustment screw 130 has the effect of tightening components arranged within the rotor shaft support assembly 101. Such adjustment has the effect of correcting any remaining deviation of the rotor shaft 104 from the ideal level orientation when supported at a single end only by the rotor shaft support assembly 101.

The arrangement of the rotor shaft support assembly 101 serves to maintain the rotor shaft 104 in a level orientation when the rotor shaft 104 is supported at a single end only by the rotor shaft support assembly 101. In particular, in the shown embodiment, the arrangement of the tail piece 107 and the bearing assembly 106 serves to maintain the rotor shaft 104 in a level orientation relative to the removable casing end plate 102.

The rotor shaft support assembly 101 is so adjustable as to provide correction for any 'drop' or 'downward pitch' of the rotor shaft 104, as indicated by arrow D, when the rotor shaft 104 is supported at a single end only by the rotor shaft support assembly 101, with the respective end portion inserted through the rotor shaft aperture 105 of the removable casing end plate 102 and supported within the removable casing plate 102 and bearing assembly 106.

It is to be appreciated that the relative arrangement of the components of the rotor shaft support assembly 101 will be factory-set and that subsequent adjustment may only be required if the factory settings have been tampered with, or during a routine service.

To remove the rotor from within the casing, the removable casing end plate 102 is detached from the remainder of the casing and slidably opened away from the interior of the casing, using the guide rails, to withdraw the rotor from within the interior of the main body of the casing of the rotary valve. The rotor shaft securing screw 117 may then be unscrewed, so that the rotor shaft 104 may be removed from the rotor shaft support assembly 101. The rotor and/or the casing interior may then be inspected and/or cleaned.

To replace the rotor within the casing, the rotor shaft 104 is inserted into the rotor shaft support assembly 101, through the rotor shaft aperture 105 of the removable casing end plate 102, into the tail piece 107 and within the bearing assembly 106 of the rotor shaft support assembly 101. The rotor shaft securing screw 117 is then screwed back into the threaded aperture 119 in the end of the rotor shaft 104 to secure the inserted end portion of the rotor shaft 104 within the rotor shaft support assembly 101. The removable casing end plate 102, with the supported rotor shaft 104, is then slidably closed towards the remainder of the casing, to insert the rotor back into the interior of the main body of the casing, after which the removable casing end plate 102 is attached to the remainder of the casing.

The guide rails (not shown) serve to maintain the alignment of the casing end plate 102, and in turn the supported end of the rotor shaft 104, in the X-axis and Y-axis directions, in the X-axis and Y-axis plane perpendicular to the Z-axis direction, relative to the interior of the main body of the casing 102. The rotor shaft support assembly 101 serves to maintain the rotor shaft 104 in the ideal level orientation when the rotor shaft is supported at a single end only when the rotor is being withdrawn from and inserted into the main body of the casing.

In-place cleaning can be carried out by general operatives without requiring special tools or fitting skills. In some industries, cleaning may be performed on a frequent, perhaps daily, basis. However, the rolling bearings of the bearing assembly may require replacement relatively infrequently, for example after a number of years.

A rotor shaft support assembly as described herein advantageously overcomes the problem of 'drop' or 'downward pitch' of the rotor shaft from the level orientation when the rotor shaft is supported at a single end that is experienced in prior art rotary valves. Such angular misalignment of the rotor shaft from the level orientation that is found with prior art rotary valves is not present in rotary valves provided with the rotor shaft support assembly as described herein. It will be appreciated that this is of particular benefit with relatively heavy rotors, which are more difficult to manoeuvre and realign than lighter weight rotors. By way of example, a known rotary valve has a rotor that weighs approximately 80 kg. In addition, negating descending inclination of a rotor shaft from the level orientation addresses a problem experienced with prior art rotary valves of the unwanted application of force by the rotor shaft to a supporting bearing assembly that can occur when the rotor shaft is supported at a single end only and so tilts under the action of gravity as to slant downwardly from the supporting bearing assembly.

The present invention provides a rotary valve comprising a rotor shaft support assembly, the rotor shaft support assembly so adjustable as to maintain the pitch of the rotor shaft in a level orientation when the rotor shaft is supported at a single end only by the rotor shaft support assembly.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A rotary valve for conveying fluids, powders or granular substances, said rotary valve comprising:
   a rotor having a rotor shaft and vanes, and
   a casing for housing the rotor within the interior of the casing, said casing comprising a removable casing end plate defining a rotor shaft aperture into which an end portion of the rotor shaft is insertable; wherein
   said rotary valve comprises a rotor shaft support assembly,
   said rotor shaft support assembly comprises said removable casing end plate and a bearing assembly for supporting an end portion of the rotor shaft inserted from the inner side of the removable casing end plate into the rotor shaft support assembly and through said rotor shaft aperture of the removable casing end plate, said rotor shaft support assembly is adjustable to correct any deviation of the pitch of the rotor shaft from a level orientation relative to said removable casing end plate when the rotor shaft is supported at a single end only by the rotor shaft support assembly with the inserted end portion of the rotor shaft supported within the removable casing end plate and the bearing assembly, said rotor shaft support assembly comprises a tail piece, said tail piece comprises a substantially tubular body having inner and outer ends and a flange extending radially outwardly of the outer surface of the substantially tubular body, said bearing assembly is disposed radially around the outer surface of the tail piece, said end portion of said rotor shaft is removably locatable within said tail piece to be supported within the removable casing end plate and the bearing assembly, and said bearing assembly comprises a bearing housing and inner and outer bearing adjustment rings each in threaded engagement with, and rotatable within, said bearing housing.

2. A rotary valve as claimed in claim 1, wherein said flange is positioned axially between said inner and outer ends of said tail piece.

3. A rotary valve as claimed in claim 1, wherein said bearing assembly further comprises a first, inner rolling bearing, a second, outer rolling bearing and a spacing ring disposed therebetween, all located between said inner and outer bearing adjustment rings.

4. A rotary valve as claimed in claim 1, wherein said bearing assembly comprises a bearing housing and inner and outer bearing adjustment rings each in threaded engagement with, and rotatable within, said bearing housing, and said flange of said tail piece is axially located between said inner and outer bearing adjustment rings.

5. A rotary valve as claimed in claim 1, wherein said bearing assembly comprises a bearing housing and inner and outer bearing adjustment rings each in threaded engagement with, and rotatable within, said bearing housing, said bearing assembly further comprises a first, inner rolling bearing, a second, outer rolling bearing and a spacing ring disposed therebetween, all located between said inner and outer bearing adjustment rings, and said flange of said tail piece is axially located between said inner bearing adjustment ring and said first, inner rolling bearing.

6. A rotary valve as claimed in claim 5, wherein said inner bearing adjustment ring comprises an annular abutment shoulder that extends outwardly and axially over the flange of said tail piece and abuts said first, inner rolling bearing.

7. A rotary valve as claimed in claim 6, wherein the outer bearing adjustment ring abuts the second, outer rolling bearing.

8. A rotary valve as claimed in claim 1, wherein said bearing housing defines a threaded aperture within which a fine adjustment screw is received, said fine adjustment screw in contact with and rotatable against the removable casing end plate.

9. A rotary valve as claimed in claim 1, wherein said removable casing end plate defines a threaded aperture within which a screw is received, said screw in contact with and rotatable against an outer surface of the inner bearing adjustment ring.

10. A rotary valve as claimed in claim 1, wherein a threaded aperture is defined in the end of said end portion of the rotor shaft, a threaded aperture is defined in the end of the outer end of the substantially tubular body of said tail piece, and said rotor shaft support assembly further comprises:

a rotor shaft securing screw, a tail piece securing screw, and a retaining washer defining apertures corresponding to said threaded apertures of the rotor shaft and the tail piece;

the rotor shaft and said tail piece being fixed to rotate together when the rotor shaft and tail piece securing screws extend through the retaining washer and are in threaded engagement with the rotor shaft and the tail piece respectively.

11. A rotary valve as claimed in claim 10, wherein said bearing assembly comprises a bearing housing and inner and outer bearing adjustment rings each in threaded engagement with, and rotatable within, said bearing housing, said bearing assembly further comprises a first, inner rolling bearing, a second, outer rolling bearing and a spacing ring disposed therebetween, all located between said inner and outer bearing adjustment rings, said flange of said tail piece is axially located between said inner bearing adjustment ring and said first, inner rolling bearing, and the flange of the tail piece is held against the first, inner rolling bearing when the rotor shaft and said tail piece are fixed to rotate together.

12. A rotary valve as claimed in claim 10, wherein a face is formed along the rotor shaft at a point of increased diameter of the rotor shaft, and the face is held against the inner end of the tail piece when the rotor shaft and said tail piece are fixed to rotate together.

13. A rotary valve as claimed in claim 1, wherein said removable casing end plate is coupled with a pair of rails that are slidably coupled to the main body of the casing.

14. A rotary valve for conveying fluids, powders or granular substances, said rotary valve comprising:

a rotor having a rotor shaft and vanes, and a casing for housing the rotor within the interior of the casing, said casing comprising a removable casing end plate defining a rotor shaft aperture into which an end portion of the rotor shaft is insertable; wherein said rotary valve comprises a rotor shaft support assembly, said rotor shaft support assembly comprises said removable casing end plate and a bearing assembly for supporting an end portion of the rotor shaft inserted from the inner side of the removable casing end plate into the rotor shaft support assembly and through said rotor shaft aperture of the removable casing end plate, said rotor shaft support assembly is adjustable to correct any deviation of the pitch of the rotor shaft from a level orientation relative to said removable casing end plate when the rotor shaft is supported at a single end only by the rotor shaft support assembly with the inserted end portion of the rotor shaft supported within the removable casing end plate and the bearing assembly, and said bearing assembly comprises a bearing housing and inner and outer bearing adjustment rings each in threaded engagement with, and rotatable within, said bearing housing.

* * * * *